(12) United States Patent
Theien et al.

(10) Patent No.: US 11,418,758 B2
(45) Date of Patent: *Aug. 16, 2022

(54) MULTIPLE SIMULTANEOUS FRAMING ALTERNATIVES USING SPEAKER TRACKING

(71) Applicant: Cisco Technology, Inc., San Jose, CA (US)

(72) Inventors: Christian Fjelleng Theien, Asker (NO); Rune Øistein Aas, Lysaker (NO); Kristian Tangeland, Oslo (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/112,091

(22) Filed: Dec. 4, 2020

(65) Prior Publication Data

US 2021/0144337 A1  May 13, 2021

Related U.S. Application Data

(63) Continuation of application No. 16/665,386, filed on Oct. 28, 2019, now Pat. No. 10,917,612, which is a
(Continued)

(51) Int. Cl.
  *H04N 7/15*  (2006.01)
  *H04N 7/01*  (2006.01)

(52) U.S. Cl.
  CPC ............... *H04N 7/152* (2013.01); *H04N 7/01* (2013.01)

(58) Field of Classification Search
  USPC ...................................................... 348/14.02
  See application file for complete search history.

(56) References Cited

U.S. PATENT DOCUMENTS

| | | | |
|---|---|---|---|
| 6,593,956 B1 | 7/2003 | Potts et al. | |
| 8,248,448 B2* | 8/2012 | Feng | H04N 5/23299 381/92 |

(Continued)

OTHER PUBLICATIONS

Bulla et al., "Region of Interest Encoding in Video Conference Systems", Proc. of International Conferences on Advances in Multimedia (MMEDIA), 2013, 6 pgs.
(Continued)

*Primary Examiner* — Maria El-Zoobi
(74) *Attorney, Agent, or Firm* — Edell, Shapiro & Finnan, LLC

(57) ABSTRACT

In one embodiment, a video conference endpoint may detect a one or more participants within a field of view of a camera of the video conference endpoint. The video conference endpoint may determine one or more alternative framings of an output of the camera of the video conference endpoint based on the detected one or more participants. The video conference endpoint may send the output of the camera of the video conference endpoint to one or more far-end video conference endpoints participating in a video conference with the video conference endpoint. The video conference endpoint may send data descriptive of the one or more alternative framings of the output of the camera to the far-end video conference endpoints. The far-end video conference endpoints may utilize the data to display one of the one or more alternative framings.

32 Claims, 8 Drawing Sheets

Related U.S. Application Data continuation of application No. 15/981,299, filed on May 16, 2018, now Pat. No. 10,516,852.

(56) References Cited

U.S. PATENT DOCUMENTS

| | | | |
|---|---|---|---|
| 9,633,270 B1 | 4/2017 | Tangeland et al. | |
| 9,769,419 B2 | 9/2017 | Tangeland et al. | |
| 9,769,424 B2 | 9/2017 | Michot | |
| 9,942,518 B1 | 4/2018 | Tangeland et al. | |
| 10,079,995 B1 | 9/2018 | Ahnoff et al. | |
| 10,778,941 B1 * | 9/2020 | Childress, Jr. | H04N 7/15 |
| 2005/0080849 A1 | 4/2005 | Wee et al. | |
| 2010/0085415 A1 | 4/2010 | Rahman | |
| 2010/0123770 A1 * | 5/2010 | Friel | H04N 7/15 348/240.99 |
| 2011/0289220 A1 * | 11/2011 | Henson | H04M 3/5116 709/227 |
| 2014/0139611 A1 | 5/2014 | Aiba | |
| 2014/0192138 A1 | 7/2014 | Kenoyer | |
| 2015/0373341 A1 | 12/2015 | Davies | |
| 2017/0244931 A1 | 8/2017 | Faulkner | |
| 2018/0109757 A1 * | 4/2018 | Romano | H04N 7/147 |
| 2019/0007623 A1 * | 1/2019 | Wang | G06V 40/103 |
| 2020/0082551 A1 | 3/2020 | Steiner | |

OTHER PUBLICATIONS

Bernardin, et al., "Multimodal Identity Tracking in a Smartroom", Universitat Karlsruhe, ITI, Personal and Ubiquitous Computing 13.1, Jan. 2013, 13 pgs.

Hata, et al., "Surveillance System with Mega-Pixel Scalable Transcoder", Mitsubishi Electric Research Laboratories, TR2007-008, SPIE Conference on Visual Communication and Image Processing (VCIP), Jan. 2007, 14 pgs.

* cited by examiner

MULTIPLE SIMULTANEOUS FRAMING ALTERNATIVES USING SPEAKER TRACKING

CROSS-REFERENCE TO RELATED APPLICATION

This application is a continuation of and claims benefit to U.S. patent application Ser. No. 16/665,386, filed Oct. 28, 2019, and issued on Feb. 9, 2021 as U.S. Pat. No. 10,917,612, which application is a continuation of and claims benefit to U.S. patent application Ser. No. 15/981,299, filed May 16, 2018, and issued on Dec. 24, 2019 as U.S. Pat. No. 10,516,852, the entire contents of which applications are incorporated herein by reference.

TECHNICAL FIELD

The present disclosure relates to framing an output of a camera of a video conference system.

BACKGROUND

A video conference system includes a "near-end" endpoint that captures audio and video of participants in a room during a conference, for example, and then transmits the audio and video to a conference server or to a "far-end" endpoint. The near-end video conference endpoint may detect participants in the captured video, their location with respect to one another and to the near-end video conference endpoint, and which one of the participants is an active speaker. The near-end video conference endpoint may also record a speaker history at the video conference endpoint. Different participants at various far-end endpoints, however, may have different requirements for an optimal framing of the captured video of the camera in order to account for each far-end endpoint's specific setup (i.e., various screen sizes, the number of screens, screen locations, etc.). Sending the far-end endpoints multiple streams of altered framings, where each stream contains a different framing of the captured video of the camera, is not an optimal situation as it requires infrastructure support and more resources at the video conference endpoints, and may present compatibility issues with some or all of the endpoints.

DESCRIPTION OF EXAMPLE EMBODIMENTS

Overview

In one embodiment, a video conference endpoint may include one or more cameras and a microphone array. The video conference endpoint may detect a one or more participants within a field of view of the one or more cameras of the video conference endpoint. The video conference endpoint may then determine one or more alternative framings of an output of the one or more cameras of the video conference endpoint based on the detected one or more participants. The video conference endpoint may then send the output of the one or more cameras of the video conference endpoint to one or more far-end video conference endpoints that are participating in a video conference with the video conference endpoint. The video conference endpoint may then send data descriptive of the one or more alternative framings of the output of the one or more cameras to far-end video conference endpoints. The far-end video conference endpoints may utilize the data to display one of the one or more alternative framings.

Example Embodiments

In one embodiment, techniques are provided to intelligently determine, generate, or calculate multiple framings of one or more participants within a field of view of a video conference endpoint. The techniques are further provided to send a single high resolution output or video stream of the camera along with information regarding the multiple alternative framings to the other video conference endpoints participating in the video conference. These techniques use less infrastructure support (network bandwidth, for example) for a video conference. These techniques further enable the utilization of less resources by each endpoint participating in a video conference because each video conference endpoint does not have to reconfigure the framing of a video stream for each of the participating far-end endpoints, and instead can output a single high resolution video stream that is received by each of the far-end video conference endpoints. These techniques also enables better compatibility between video conference endpoints with different setups as each of the far-end video conference endpoints are able to select the generated framing that best suits their specific video conference endpoint setup. Thus, these techniques enable each far-end video conference endpoint to select the best (desired) framing of the high resolution video stream for their specific setup, and alleviates the near-end video conference endpoint from having to send multiple specifically framed video streams to account for each of the setups of the far-end video conference endpoints.

Figure 1:
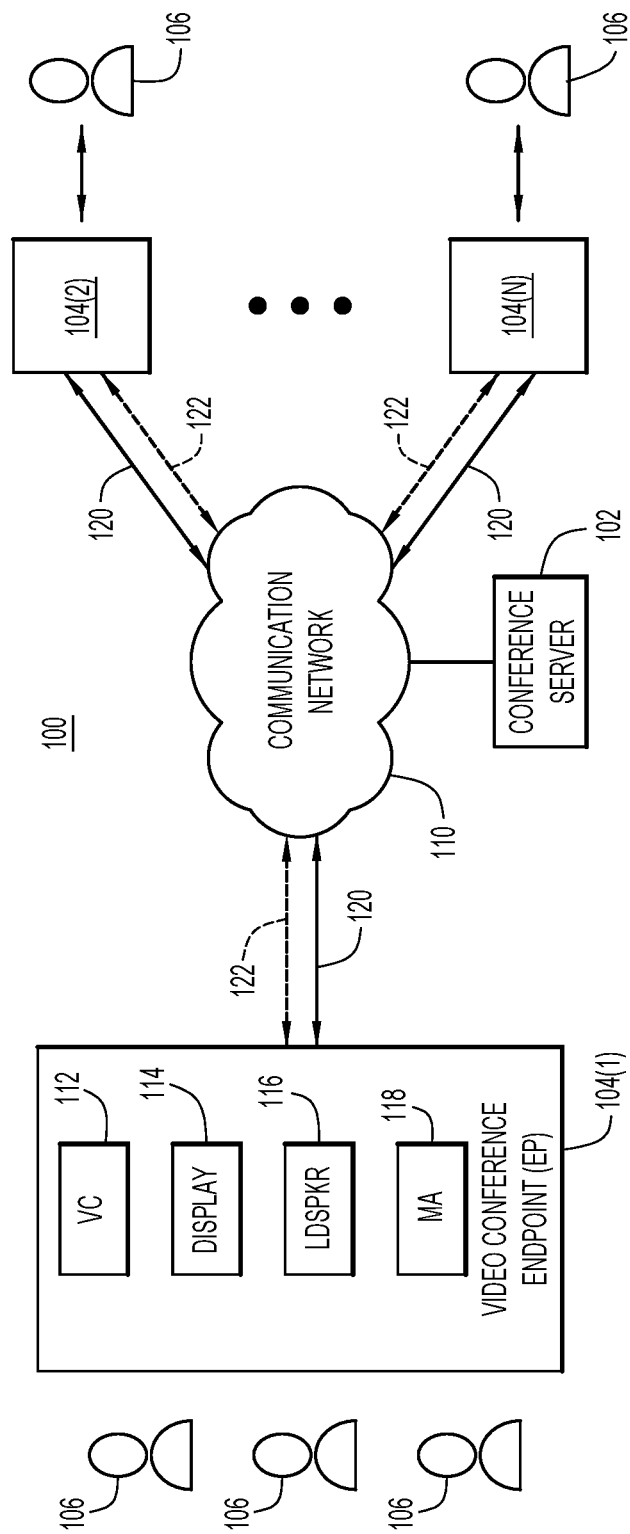
FIG. 1 is a block diagram of a video conference system in which a video conference endpoint generates alternative framings of a captured video output of a camera and sends, with the stream of the captured video output, information regarding the alternative framings to other video conference endpoints, according to an example embodiment.

With reference to FIG. 1, there is depicted a block diagram of a video conference environment (system) 100 in which a video conference endpoint generates alternative framings of the video camera output based on the participants within the view of the video camera, their positioning with respect to one another, etc. Video conference environment 100 includes two or more video conference endpoints 104(1)-104(N) operated by local users/participants 106 and configured to establish audio-visual teleconference collaboration sessions with each other over a communication network 110. Communication network 110 may include one or more wide area networks (WANs), such as the Internet, and one or more local area networks (LANs). A conference server 102 may also be deployed to coordinate the routing of audio-video streams among the video conference endpoints 104(1)-104(N).

Each video conference endpoint 104(1)-104(N) may include one or more video cameras (VC) 112, a video display 114, a loudspeaker (LDSPKR) 116, and a microphone array (MA) 118. Endpoints 104(1)-104(N) may be wired or wireless communication devices equipped with the aforementioned components, such as, but not limited to, laptop and tablet computers, smartphones, etc. In a transmit direction, endpoints 104(1)-104(N) capture audio/video from their local participants 106 with MA 118/VC 112, encode the captured audio/video into data packets, and transmit the data packets to other endpoints 104(1)-104(N) or to the conference server 102. In a receive direction, endpoints 104(1)-104(N) decode audio/video from data packets received from the conference server 102 or other endpoints 104(1)-104(N) and present the audio/video to their local participants 106 via loudspeaker 116/display 114. The video conference endpoints 104(1)-104(N) may send the data packets through the communication network 110 via a primary data channel 120. As further detailed below, in some embodiments, some of the data packets may be sent through the communication network 110 via one or more secondary or side data channels 122.

Figure 2:
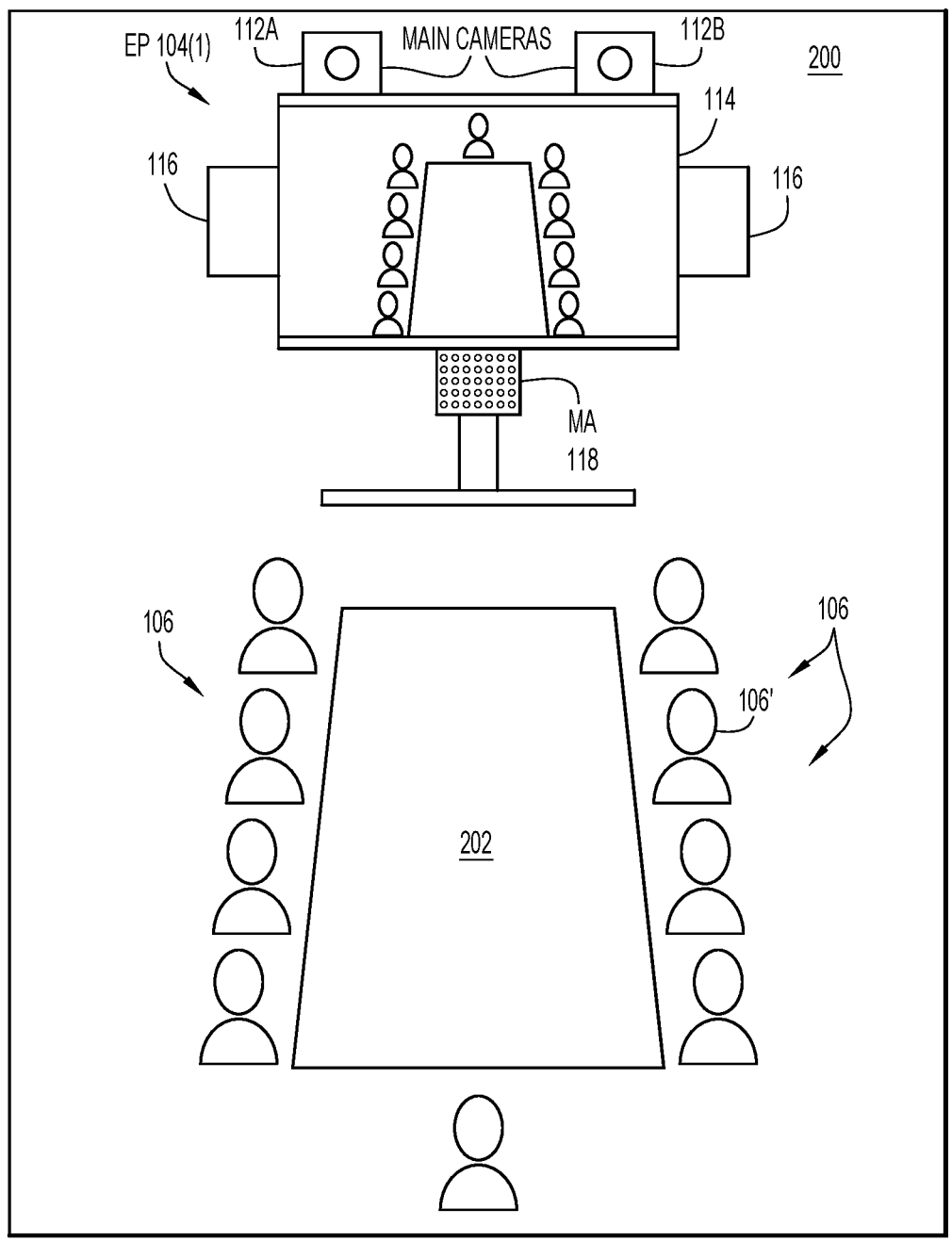
FIG. 2 is an illustration of video conference endpoint deployed in a conference room in which there are multiple meeting participants sitting around a conference table, according to an example embodiment.

Referring now to FIG. 2, there is an illustration of a near-end video conference endpoint 104(1) deployed in a conference room 200 (depicted simplistically as an outline in FIG. 2), according to an embodiment. The near-end video conference endpoint 104(1) includes main or center video cameras 112A and 112B positioned proximate and centered on display 114. Each of cameras 112A and 112B typically includes pan, tilt, and zoom (PTZ) features that may be implemented mechanically and/or digitally. Near-end endpoint 104(1) controls the pan, tilt, and zoom features of each of the cameras 112A and 112B (collectively referred to as "camera 112") to capture video of different views/scenes of participants 106 within the conference room 200, including a participant 106' who is actively talking. In the embodiment illustrated, the participants 106, including the active speaker 106', are seated around a conference table 202 opposite from or facing (i.e., in front of) the camera 112 (and display 114). In other embodiments, the participants 106 may be standing in various locations within the conference room 200, or may be located proximate to other objects (e.g., a projection screen, an interactive whiteboard screen, etc.) within the conference room 200. The combination of two video cameras depicted in FIG. 2 is only one example of many possible camera combinations that may be used, as would be appreciated by one of ordinary skill in the relevant arts having read the present description. As depicted in the example of FIG. 2, MA 118 is positioned adjacent to, and centered along, a bottom side of display 114 (i.e., below the display) so as to receive audio from participants 106 and 106' in room 200. However, in other embodiments, MA 118 may be located in other locations with respect to the camera 112, such as the table 202.

The camera 112 and the MA 118 of the near-end video conference endpoint 104(1) collectively form a speaker tracking system configured to automatically locate each of the participants within a field of view of the camera 112 of the near-end endpoint 104(1), as well as an active speaker at the near-end endpoint 104(1). In accordance with techniques presented herein, video conference endpoint 104(1) (i) detects participants by utilizing facial detection techniques, upper body detection techniques, and/or motion detection techniques on the video output of the camera 112, (ii) detects positions of participants and if any of the participants are talking participants (i.e., "talkers", "active speakers", etc.) based on audio detected by MA 118, and (iii) performs group-based speaker tracking. Based on the detected participants, their positions, and/or detected active speakers, near-end video conference endpoint 104(1) may automatically generate one or more possible alternative framings of the output or video stream of the camera 112.

Figure 3:
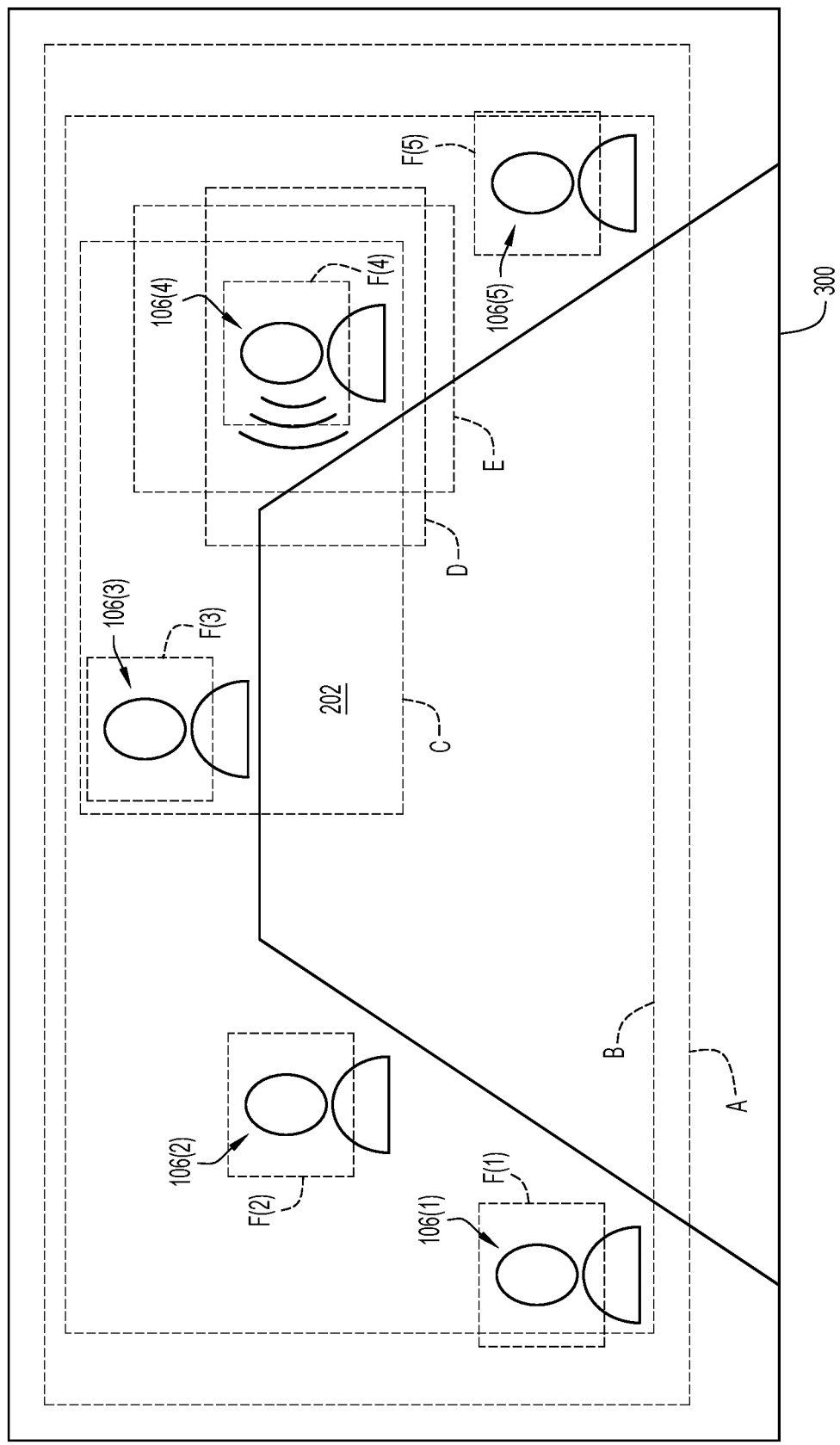
FIG. 3 is a diagram that illustrates an example of a video camera output for which the alternative framing generation techniques presented herein may be employed, according to an example embodiment.

With reference to FIG. 3, and continued reference to FIGS. 1 and 2, illustrated is an example scenario of one or more frames of an output/video stream 300 of the video camera 112 of endpoint 104(1) in which five participants 106(1)-106(5) are seated around table 202. It is to be understood that FIG. 3 is drawn to a scale that purposefully and intentionally conveys the relative distances/proximities between each of the participants 106(1)-106(5) around table 202. As illustrated in FIG. 3, participant 106(4) may be actively speaking, while the remaining participants 106(1)-106(3), 106(5) may be listening to participant 106(4) actively speak.

FIG. 3 further illustrates several alternative framings that may be determined or generated by the near-end endpoint 104(1) for the output 300 of the video camera 112. The first framing A and the second framing B may frame all of the participants 106(1)-106(5) within the view of the camera 112. First framing A may be a wide overview framing of all of the participants 106(1)-106(5) within the view of the camera 112 of the near-end endpoint 104(1). Second framing B may be a tight framing of all of the participants 106(1)-106(5) (i.e., the tightest possible framing of the output of the camera 112 that still includes each of the participants 106(1)-106(5) without cutting a portion of the participants 106(1)-106(5) from being within the framing) within the view of the camera 112 of the near-end endpoint 104(1). The near-end endpoint 104(1) may further generate or determine other alternative framings of the output 300 of the camera 112, such as the third framing C, the fourth framing D, and the fifth framing E. The third framing C may be a wide close-up framing of the detected active speaker 106(4), where the wide close-up framing includes a view of the active speaker 106(4) along with some of the surroundings of the active speaker 106(4). As illustrated in FIG. 3, the third framing C may include both the active speaker 106(4) and another participant 106(3) that is within a close proximity to the active speaker 106(4). The fourth framing D may be a tight close-up framing of the current active speaker 106(4), where the framing is a close-up of the active speaker 106(4) without framing much of the surroundings of the active speaker 106(4). The fifth framing E may be a close-up framing of the active speaker 106(4) with an alternative aspect ratio, such as an 8:9 aspect ratio, where the third and fourth framings C, D are of a more traditional 16:9 aspect ratio. In addition, the near-end endpoint 104(1) may also generate a sixth alternative framing F(1)-F(5), which are a set of thumbnail framings of each of the heads of the participants 106(1)-106(5) within the view of the camera 112.

Figure 4:
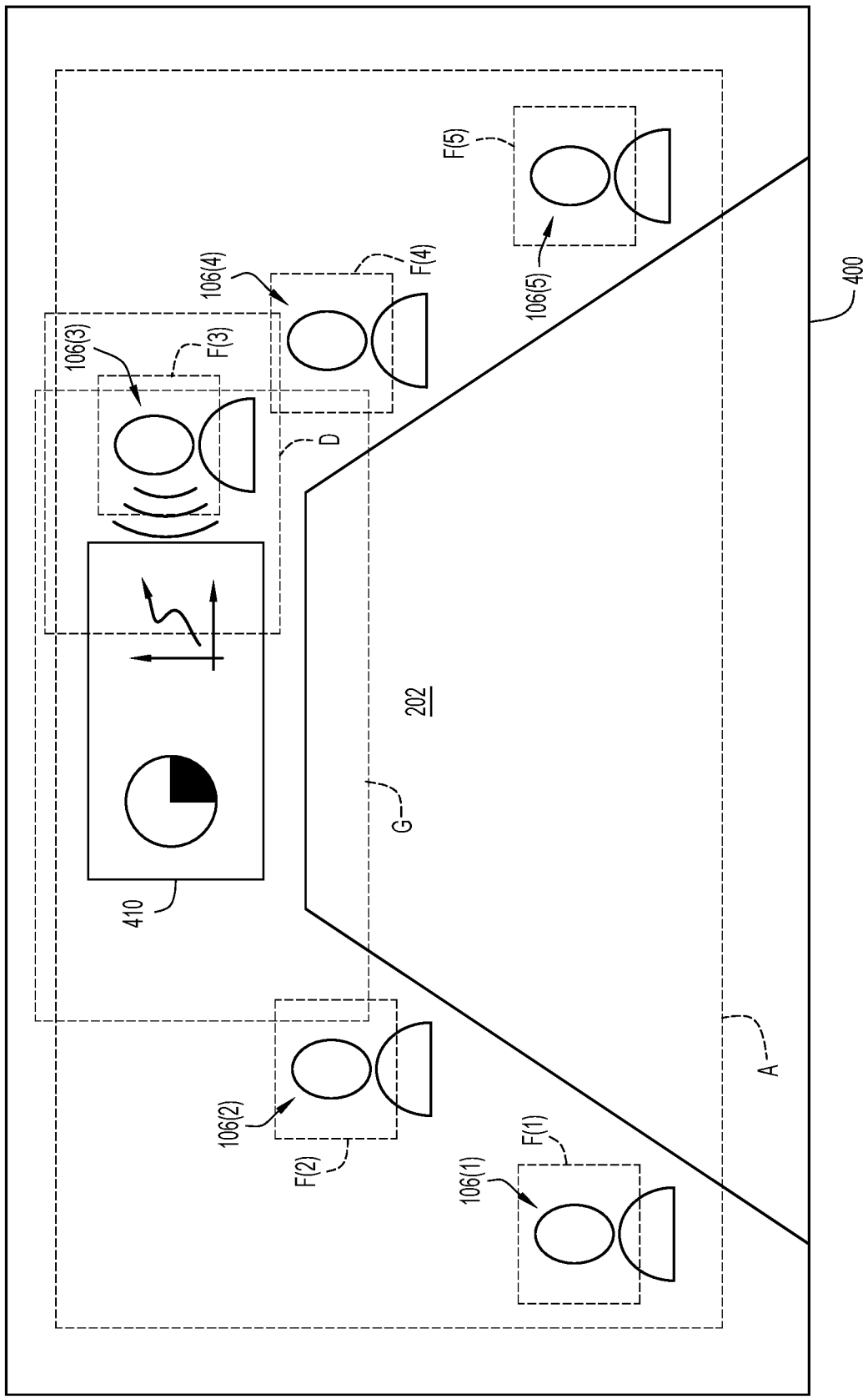
FIG. 4 is a diagram that illustrates another example of a video camera output for which the alternative framing generation techniques presented herein may be employed, according to an example embodiment.

With reference to FIG. 4, and continued reference to FIGS. 1-3, illustrated is another example scenario of one or more frames of an output/video stream 400 of the video camera 112 of endpoint 104(1) in which four participants 106(1), 106(2), 106(4), 106(5) are seated around table 202, and participant 106(3) is standing near a whiteboard display 410 proximate to the end of table 202. It is to be understood that FIG. 4 is drawn to a scale that purposefully and intentionally conveys the relative distances/proximities between each of the participants 106(1)-106(5) around table 202. As illustrated in FIG. 4, participant 106(3) may be actively speaking while standing next to the whiteboard display 410, while the remaining participants 106(1), 106(2), 106(4), 106(5) may be listening and watching participant 106(3) actively speak and present the contents of the whiteboard display 410. The whiteboard display 410 may be disposed on the opposite end of table 202 from the camera 112 of the near-end endpoint 104(1), and thus, may be within the view of the camera 112.

FIG. 4 further illustrates several alternative framings that may be determined or generated by the near-end endpoint 104(1) for the output 400 of the video camera 112. The first framing A, like that of FIG. 3, may frame all of the participants 106(1)-106(5) within the view of the camera 112, as well as the whiteboard display 410. More specifically, first framing A may be a wide overview framing of all of the participants 106(1)-106(5) and whiteboard display 410 within the view of the camera 112 of the near-end endpoint 104(1). As further illustrated in FIG. 4, the near-end endpoint 104(1) may also generate or determine an alternative framing of the output 400 of the camera 112, such as alternative framing D, which, as similarly illustrated in FIG. 3, may be a tight close-up framing of the current active speaker 106(3). Thus, alternative framing D may be a close-up of the active speaker 106(3) without framing much of the surroundings of the active speaker 106(3) (i.e., does not include the framing of other participants 106(1)-106(2), 106(4)-106(5) that may be nearby) and may have an aspect ratio of 16:9. The near-end endpoint 104(1) may also generate alternative framings F(1)-F(5), which, similar to that of FIG. 3, are a set of thumbnail framings of the head of each of the participants 106(1)-106(5) within the view of the camera 112 of the near-end endpoint 104(1). One additional alternative framing that FIG. 4 illustrates, and that is not illustrated in FIG. 3, is alternative framing G. When the speaker tracking system of the near-end endpoint 104(1) detects that a whiteboard 410, or another similar type of display device or unit, is present in the conference room 200 and within the view of the camera 112 of the near-end endpoint 104(1), the near-end endpoint 104(1) may generate or determine an alternative framing G that includes the whiteboard display 410 and the active speaker 106(3) that may be speaking at the whiteboard display 410. As illustrated in FIG. 4, the active speaker 106(3) is positioned proximate or next to the whiteboard display 410 while actively speaking, and thus, alternative framing G may be generated to include the whiteboard display 410 and the active speaker 106(3) next to the whiteboard display 410.

While FIGS. 3 and 4 illustrate several alternative framings available for video outputs 300 and 400, respectively, any number of alternative framings may be determined by the video conference endpoint 104(1) based on the number of detected participants, their locations with respect to each other, their interactions with respect to each other, the number of presentation aides and devices (e.g., whiteboard display 410, sample products/prototypes, etc.) located within the view of the camera 112, and the interactions and proximities of the participants with respect to the presentation aides. Moreover, while FIGS. 3 and 4 illustrate five participants 106(1)-106(5) positioned around table 202, the near-end endpoint 104(1) may determine alternative framings for any number of participants within a view of a camera, and whether or not they are positioned around a table 202.

Figure 5:
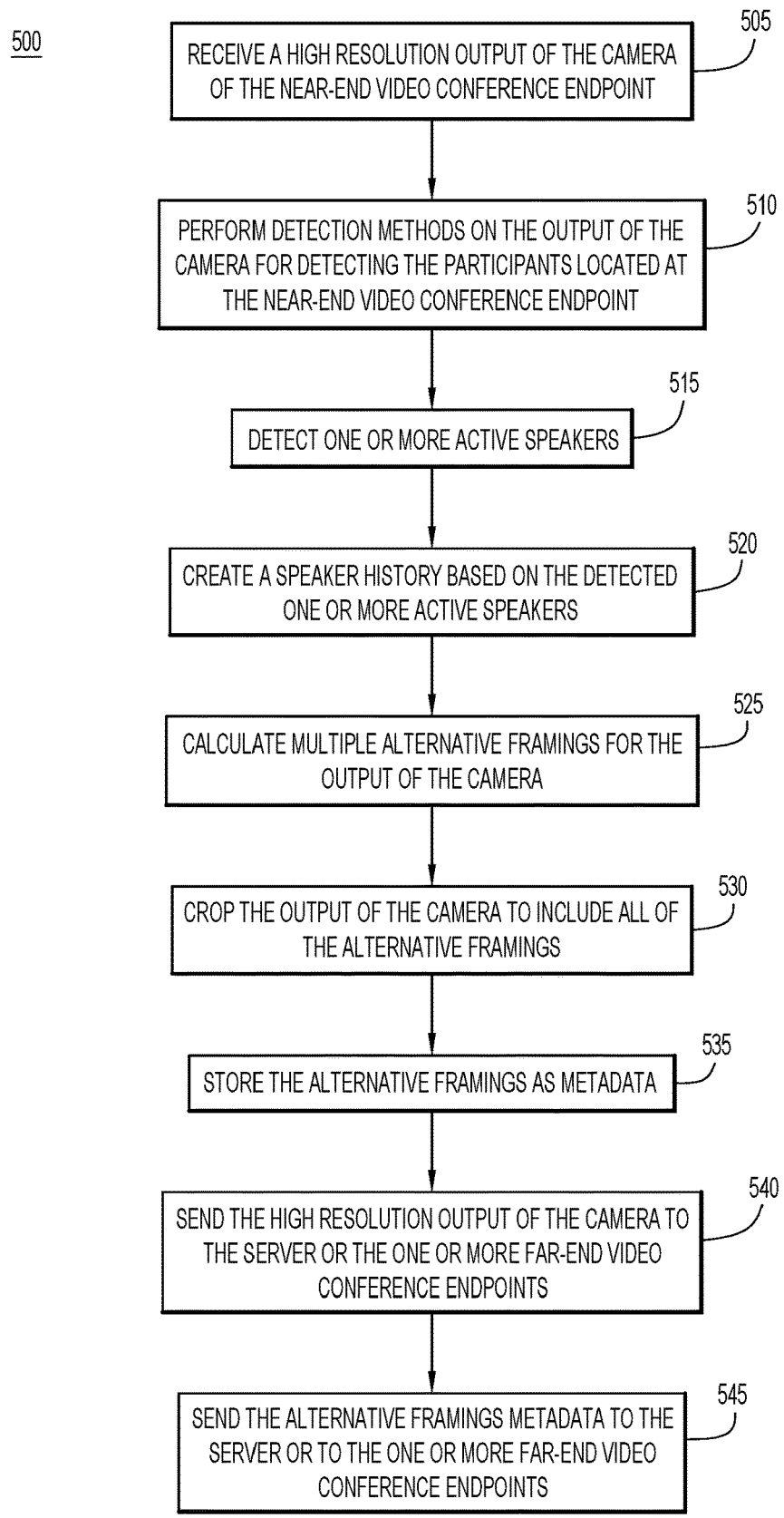
FIG. 5 is a flowchart depicting the operations of the techniques for generating alternative framings of captured video, according to an example embodiment.

With reference to FIG. 5, and continued reference to FIGS. 1-4, illustrated is a method 500 performed by the near-end video conference endpoint 104(1) in order to determine the alternative framings of the output of the video camera 112 of the near-end video conference endpoint 104(1) and send the output of the video camera 112 to the far-end video conference endpoints 104(2)-104(N). At 505, the near-end video conference endpoint 104(1) receives a video output of the camera 112 of the near-end video conference endpoint 104(1). The video output may be a high resolution video output of the camera 112. At 510, the near-end video conference endpoint 104(1) then performs detection methods and techniques on the output of the camera 112 in order to detect participants and track their locations within the view of the camera 112 of the near-end video conference endpoint 104(1). The near-end video conference endpoint 104(1) may detect and track the participants by using one or more of the techniques of face detection, gaze detection, upper body detection, or motion detection techniques on the output of least one video camera 112 of the video conference endpoint 104(1). At 515, the near-end video conference endpoint 104(1) may then detect if there are any active speakers in proximity to the near-end video conference endpoint 104(1). The near-end video conference endpoint 104(1) may use the microphone array 118 to determine if there are any active speakers by using various audio detection techniques, such as audio triangulation, in order to detect which participant(s) is actively speaking and their location(s) within the output of the camera 112. At 520, the near-end video conference endpoint 104(1) may then create, and continue to track, a speaker history based on the detected one or more active speakers. As the active speaker changes, the endpoint 104(1) notes the change in active speaker and the time of the change in the speaker history. At 525, the near-end video conference endpoint 104(1) then determines one or more alternative framings of the output of the camera 112 based on the detected participants, their locations, the detected active speaker(s), and the speaker history. The alternative framings determined at 525 may be similar to those illustrated and discussed with reference to FIGS. 3 and 4.

With continued reference to FIG. 5, at 530, the near-end video conference endpoint 104(1) may crop the output of the camera 112 to a re-framed size that includes all of the potential determined alternative framings from step 525. At 535, the near-end video conference endpoint 104(1) may store the information and details (i.e., size, aspect ratio, location within the output of the camera, etc.) regarding each of the alternative framings as metadata for the output of the camera 112. At 540, the near-end video conference endpoint 104(1) may send the output of the camera 112 to the conference server 102 or directly to the one or more far-end video conference servers 104(2)-104(N). If the near-end video conference endpoint 104(1) sends the output of the camera 112 to the conference server 102, the conference server 102 may distribute the output of the camera 112 to each of the far end video conference endpoints 104(2)-104(N) that are participating in a video conference with the near-end video conference endpoint 104(1). As explained previously, the output of the camera 112 may be a high resolution video output of the camera 112. Moreover, the near-end video conference endpoint 104(1) may send the output of the camera 112 to the one or more far-end video conference servers 104(2)-104(N), either directly or by way of the conference server 102, via the primary communication channel 120. At 545, the near-end video conference endpoint 104(1) may then send metadata of the alternative framings to the conference server 102 or directly to the one or more far-end video conference servers 104(2)-104(N). If the near-end video conference endpoint 104(1) sends the metadata to the conference server 102, the conference server 102 may distribute the metadata to each of the far end video conference endpoints 104(2)-104(N) that are participating in a video conference with the near-end video conference endpoint 104(1). The near-end video conference endpoint 104(1) may send the metadata to the one or more far-end video conference servers 104(2)-104(N), either directly or by way of the conference server 102, via the secondary metadata side channel 122. In one example embodiment, the near-end video conference endpoint 104(1) may send the metadata as an H.264 SEI message via the metadata side channel 122. In other examples, the near-end video conference endpoint 104(1) may send the metadata to the one or more far-end video conference endpoints via the primary communication channel 120 with the output of the camera 112.

Figure 6:
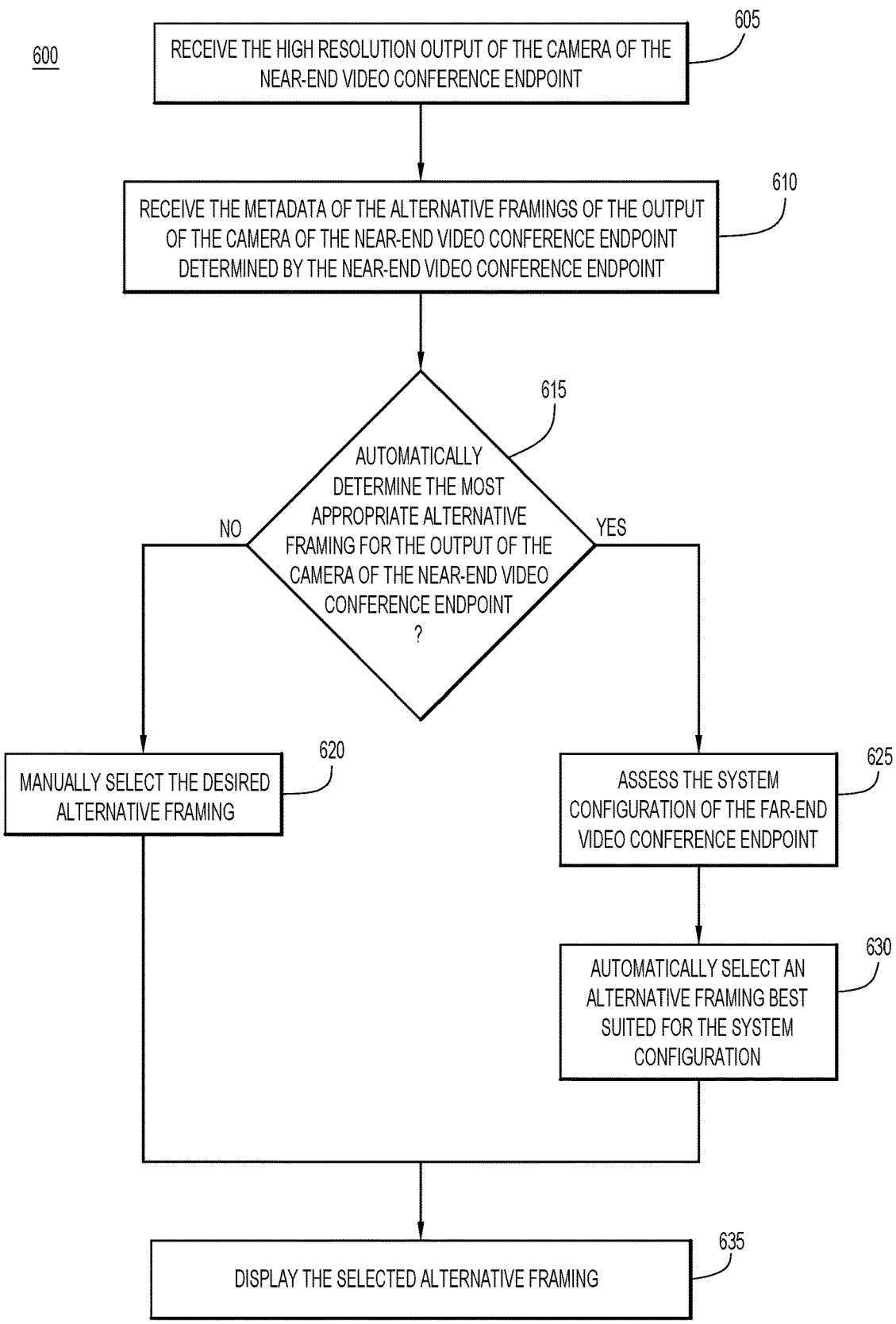
FIG. 6 is a flowchart depicting the operation of altering the framing of the captured video by one of the far-end endpoints that receives the captured video stream, according to an example embodiment.

Reference is now made to FIG. 6, with continued reference to FIGS. 1-5, which shows an example method 600 of a far-end video conference endpoint 104(2)-104(N) processing the received output of the camera 112 of the near-end video conference endpoint 104(1) and the metadata of the alternative framings of the output of the camera 112. At 605, the far-end video conference endpoint 104(2)-104(N) receives the output of the camera 112 of the near-end video conference endpoint 104(1). As previously explained, the output of the camera 112 of the near-end video conference endpoint 104(1) is received via a primary connection channel 120, and can be received either directly from the near-end video conference endpoint 104(1) or from the conference server 102. Furthermore, the output of the camera 112 of the near-end video conference endpoint 104(1) may be a high resolution video output of the camera 112. At 610, the far-end video conference endpoint 104(2)-104(N) receives the metadata of the alternative framings that have been determined or generated by the near-end video conference endpoint 104(1). As previously explained, the metadata may be received either through a metadata side channel 122 or through the primary communication channel 120 with the output of the camera 112.

At 615, the far-end video conference endpoint 104(2)-104(N) decides whether or not to automatically determine the most appropriate alternative framing for the output of the camera 112 of the near-end video conference endpoint 104(1). If at 615, the far-end video conference endpoint 104(2)-104(N) decides to not automatically determine the most appropriate alternative framing, then, at 620, the desired alternative framing is manually selected by a participant 106 located at the far-end video conference endpoint 104(2)-104(N). If at 615, however, the far-end video conference endpoint 104(2)-104(N) decides to automatically determine the most appropriate alternative framing, then, at 625, the far-end video conference endpoint 104(2)-104(N) may assess its own system configuration to determine the configuration and setup available at the far-end video conference endpoint 104(2)-104(N). For example, the far-end video conference endpoint 104(2)-104(N) may assess the number and location(s) of the display screens 114, the size of each of the display screens 114, the number and location(s) of the loudspeakers 116, the positioning of the participants 106 with respect to the endpoint 104(2)-104(N), the display screens 114, and the loudspeakers 116, etc. In some embodiments, the far-end video conference endpoint 104(2)-104(N) may have this information stored from previous assessments, and may simply access this stored information. At 630, the far-end video conference endpoint 104(2)-104(N) may automatically select the alternative framing that is best suited for the system configuration of that far-end video conference endpoint 104(2)-104(N). Whether the alternative framing is manually selected by a participant 106 or is automatically selected by the far-end video conference endpoint 104(2)-104(N), once the alternative framing is selected, the far-end video conference endpoint 104(2)-104(N), at 635, displays the selected alternative framing.

Figure 7:
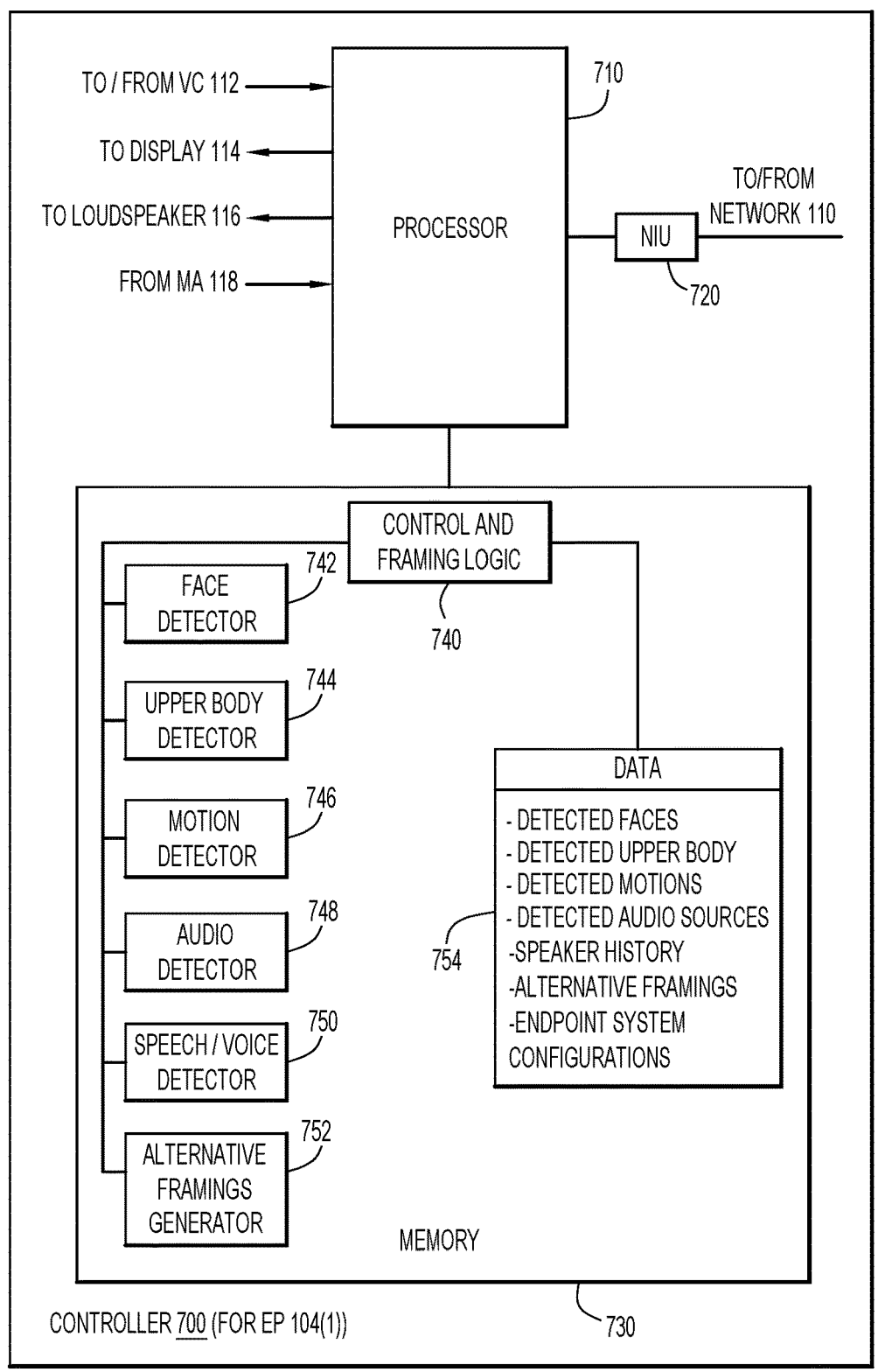
FIG. 7 is a block diagram of a controller of the video conference endpoint, wherein the controller is configured to perform the alternative framing techniques, according to an example embodiment.

Reference is now made to FIG. 7, which shows an example block diagram of a controller 700 of the video conference endpoint 104(1) configured to perform the framing techniques according to embodiments described herein. There are numerous possible configurations for controller 700 and FIG. 7 is meant to be an example. Controller 700 includes a processor 710, a network interface unit 720, and memory 730. The network interface (I/F) unit (NIU) 720 is, for example, an Ethernet card or other interface device that allows the controller 700 to communicate over communication network 110. Network I/F unit 720 may include wired and/or wireless connection capability.

Processor 710 may include a collection of microcontrollers and/or microprocessors, for example, each configured to execute respective software instructions stored in the memory 730. The collection of microcontrollers may include, for example: a video controller to receive, send, and process video signals related to display 114 and video camera 112; an audio processor to receive, send, and process audio signals related to loudspeaker 116 and MA 118; and a high-level controller to provide overall control. Processor 710 may send pan, tilt, and zoom commands to video camera 112, which is responsive to the commands as would be appreciated by one of ordinary skill in the relevant arts. Portions of memory 730 (and the instruction therein) may be integrated with processor 710. In the transmit direction, processor 710 encodes audio/video captured by MA 118/VC 112, encodes the captured audio/video into data packets, encodes the alternative framings metadata into packets, and causes the encoded data packets to be transmitted to communication network 110. In a receive direction, processor 710 decodes audio/video and the alternative metadata from data packets received from communication network 110 and causes the audio/video to be presented to local participants via loudspeaker 116/display 114.

The memory 730 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 730 may comprise one or more computer readable storage media (e.g., a memory device) encoded with software comprising computer executable instructions and when the software is executed (by the processor 710) it is operable to perform the operations described herein. For example, the memory 730 stores or is encoded with instructions for Control and Framing logic 740 to perform overall control of endpoint 104 and operations described herein for generating alternative framings of the output of the camera 112. Control and Framing logic 740 includes a Face Detector 742 to detect faces and face positions/facing directions based on captured video, an Upper Body Detector 744 to detect the upper bodies and upper body positions of participants based on captured video, a Motion Detector 746 to detect the motions and movements of participants based on captured video, an Audio Detector 748 to detect positions of active audio sources (e.g., talkers, active speakers, etc.) based on the detected audio, a Speech/Voice Detector 750 to identify portions of detected audio as well as to identify speaking participants, and an Alternative Framings Generator 752 to generate the possible alternative framings of the output of the camera 112.

In addition, memory 730 stores data 754 used and generated by logic/detectors 740-748, including, but not limited to: information associated with detected faces (e.g., positions, confidence levels, stored detected faces, facing directions and the like); information associated with detected upper bodies (e.g., positions of participants); information associated with detected motions (e.g., positions of participants); information associated with detected active audio sources (e.g., positions of speakers); information associated with speaker histories (e.g., which participants were speaking, when specific participants were speaking, etc.); information defining the generated alternative framings, and information representing the system configurations of the endpoint.

Figure 8:
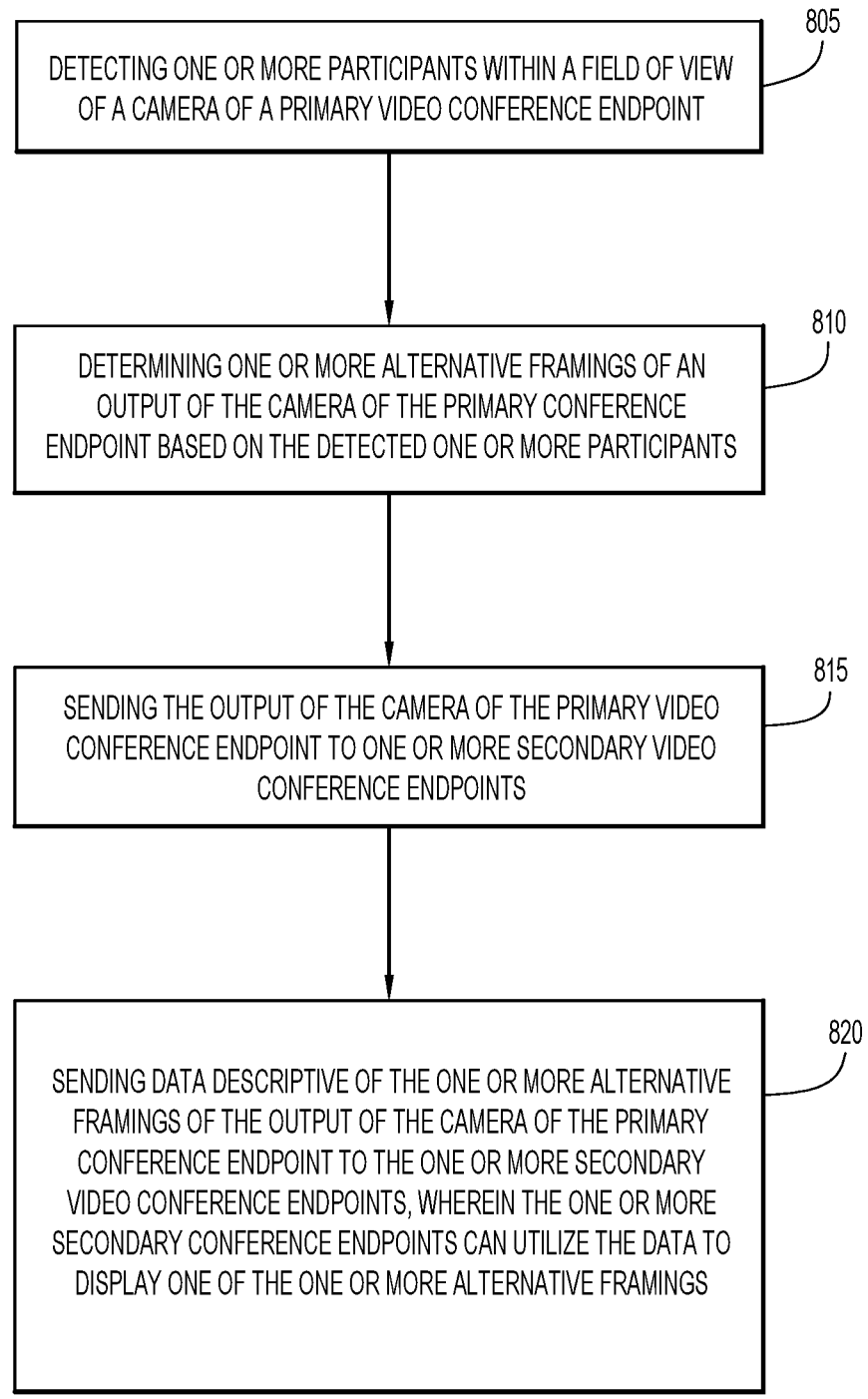
FIG. 8 is a flowchart of a method of generating alternative framings of a video output of a video conference endpoint and sending information pertaining to the generated alternative framings to other video conference endpoints, according to an example embodiment.

With reference to FIG. 8, illustrated is a flowchart of a method 800 performed by the video conference endpoint for generating and sending alternative framing information with the video output of one or more cameras to other video conference endpoints participating in a video conference. Reference is also made to FIGS. 1-7 for purposes of the description of FIG. 8. At 805, the primary or near-end video conference endpoint 104(1) detects, via the camera, the one or more participants at the primary video conference endpoint 104. As illustrated in FIGS. 2-4, the participants 106 may be disposed within a conference room 200, and disposed around a table 202 within the conference room 200. The primary video conference endpoint 104(1) may detect the participants by using one or more of face detection, gaze detection, upper body detection, or motion detection techniques on the output of least one video camera 112 of the primary video conference endpoint 104(1). At 810, the primary video conference endpoint 104(1) determines one or more alternative framings of an output of the camera 112 of the primary video conference endpoint. The one or more alternative framings may be determined based on the detected one or more participants 106. At 815, the primary video conference endpoint 104(1) sends the output of the camera 112 of the primary video conference endpoint 104(1) to the one or more secondary or far-end video conference endpoints 104(2)-104(N) via the communication network 110. As explained previously, the primary video conference endpoint 104(1) may send the output of the camera 112 via a primary communication channel 120.

At 820, the primary video conference endpoint 104(1) may send data descriptive of the determined alternative framings to the one or more secondary video conference endpoints 104(2)-104(N). As previously explained, this data may be sent as metadata via a side channel 122 or with the output of the camera 112 via the primary connection channel 120. The data may be utilized by the one or more secondary video conference endpoints 104(2)-104(N) to (select for display) display one of the alternative framings of the output of the camera 112 of the primary video conference endpoint 104(1).

In summary, current video conference endpoints create and send multiple video camera output streams during video conferences, where each video camera output stream represents a different framing of the output of the video camera. This requires infrastructure support (increased network bandwidth, for example) and a large amount of resources from the video conference environment (i.e., the video conference endpoints and video conference server), and may present compatibility issues with some or all of the endpoints of a video conference. According to one embodiment, presented herein is a method to generate multiple potential alternative framings of the video output of a camera of a video conference endpoint, send a single video output of the camera to the far-end video conference endpoints, send the data of the alternative framings to the far-end video conference endpoints, and enable each far-end video conference endpoint to select and display the alternative framing that is best suited for that specific video conference endpoint's system configuration. This reduces the amount of resources and bandwidth used during a video conference session, and enables each far-end video conference endpoint to both choose whether or not to select the alternative framing that best suits its system configuration, and to display the selected alternative framing.

In one form, a method is provided comprising: detecting, by a primary video conference endpoint, a one or more participants within a field of view of a camera of the primary video conference endpoint; determining, by the primary video conference endpoint, one or more alternative framings of an output of the camera of the primary video conference endpoint based on the detected one or more participants; sending, by the primary video conference endpoint, the output of the camera of the primary video conference endpoint to one or more secondary video conference endpoints; and sending, by the primary video conference endpoint, data descriptive of the one or more alternative framings of the output of the camera of the primary video conference endpoint to the one or more secondary video conference endpoints, wherein the one or more secondary conference endpoints can utilize the data to display one of the one or more alternative framings for display at the one or more secondary conference endpoints.

In another form, an apparatus is provided comprising: a network interface unit that enables communication over a network by a primary video conference endpoint; and a processor coupled to the network interface unit, the processor configured to: detect a one or more participants within a field of view of a camera of the primary video conference endpoint; determine one or more alternative framings of an output of the camera of the primary video conference endpoint based on the detected one or more participants; send the output of the camera of the primary video conference endpoint to one or more secondary video conference endpoints; and send data descriptive of the one or more alternative framings of the output of the camera of the primary video conference endpoint to the one or more secondary video conference endpoints, wherein the one or more secondary conference endpoints can utilize the data to display one of the one or more alternative framings for display at the one or more secondary conference endpoints.

In yet another form, a non-transitory processor readable medium is provided. The medium stores instructions that, when executed by a processor, cause the processor to: detect a one or more participants within a field of view of a camera of a primary video conference endpoint; determine one or more alternative framings of an output of the camera of the primary video conference endpoint based on the detected one or more participants; send the output of the camera of the primary video conference endpoint to one or more secondary video conference endpoints; and send data descriptive of the one or more alternative framings of the output of the camera of the primary video conference endpoint to the one or more secondary video conference endpoints, wherein the one or more secondary conference endpoints can utilize the data to display one of the one or more alternative framings for display at the one or more secondary conference endpoints.

The above description is intended by way of example only. Various modifications and structural changes may be made therein without departing from the scope of the concepts described herein and within the scope and range of equivalents of the claims.

What is claimed is:

1. A method comprising:
    detecting one or more participants in a video stream from a camera associated with a first device;
    determining one or more alternative framings of the video stream based at least in part upon the detected one or more participants, wherein the video stream comprises data representing a field of view of the camera, each of the one or more alternative framings comprises one or more corresponding portions of the video stream, and a first alternative framing of the one or more alternative framings comprises a portion of the video stream that is less than the field of view of the camera;
    transmitting the video stream to one or more remote devices; and
    transmitting data descriptive of the one or more alternative framings, including the first alternative framing, of the video stream to the one or more remote devices.

2. The method of claim 1, wherein the video stream is a high resolution video stream.

3. The method of claim 1, wherein the video stream is sent to one of the one or more of the remote devices via a first channel.

4. The method of claim 3, wherein the data descriptive of the one or more alternative framings is transmitted to another one of the one or more of the remote devices via a second channel.

5. The method of claim 3, wherein the data descriptive of the one or more alternative framings is transmitted to the one of the one or more of the remote devices with the video stream via the first channel.

6. The method of claim 1, further comprising:
    detecting a first participant of the one or more participants as an active speaker.

7. The method of claim 6, wherein a second alternative framing of the one or more alternative framings is based at least in part upon the first participant.

8. The method of claim 6, wherein the first participant is detected based at least in part upon an audio signal from a microphone associated with the first device.

9. The method of claim 1, wherein the one or more participants are detected based at least in part upon an audio signal from a microphone associated with the first device.

10. The method of claim 1, wherein the video stream is sent to the one or more remote devices by way of a server.

11. The method of claim 1, wherein the data descriptive of the one or more alternative framings is sent to the one or more remote devices by way of a server.

12. The method of claim 1, wherein a second alternative framing of the one or more alternative framings comprises two or more portions of the video stream, and each portion of the two or more portions comprises at least a portion of one unique participant of the detected one or more participants.

13. An apparatus comprising:
    a processor; and
    a memory operatively coupled to the processor and having computer executable instructions stored thereon that, when executed by the processor, cause the processor to:
        detect one or more participants in a video stream from a camera associated with a first device;
        determine one or more alternative framings of the video stream based at least in part upon the detected one or more participants, wherein the video stream comprises data representing a field of view of the camera, each of the one or more alternative framings comprises one or more corresponding portions of the video stream, and a first alternative framing of the one or more alternative framings comprises a portion of the video stream that is less than the field of view of the camera;
        transmit the video stream to one or more remote devices; and
        transmit data descriptive of the one or more alternative framings, including the first alternative framing, of the video stream to the one or more remote devices.

14. The apparatus of claim 13, wherein the computer executable instructions, when executed by the processor, cause the processor to:
    detect a first participant of the one or more participants as an active speaker, and a second alternative framing of the one or more alternative framings is based at least in part upon the first participant.

15. The apparatus of claim 13, wherein the video stream is sent to the one or more remote devices by way of a server, and the data descriptive of the one or more alternative framings is sent to the one or more remote devices by way of the server.

16. The apparatus of claim 13, wherein a second alternative framing of the one or more alternative framings comprises two or more portions of the video stream, and each portion of the two or more portions comprises at least a portion of one unique participant of the detected one or more participants.

17. A non-transitory processor readable medium storing instructions that, when executed by a processor, cause the processor to:
    detect one or more participants in a video stream from a camera associated with a first device;
    determine one or more alternative framings of the video stream based at least in part upon the detected one or more participants, wherein the video stream comprises data representing a field of view of the camera, each of the one or more alternative framings comprises one or more corresponding portions of the video stream, and a first alternative framing of the one or more alternative framings comprises a portion of the video stream that is less than the field of view of the camera;
    transmit the video stream to one or more remote devices; and
    transmit data descriptive of the one or more alternative framings, including the first alternative framing, of the-video stream to the one or more remote devices.

18. The non-transitory processor readable medium of claim 17, further comprising instructions that, when executed by the processor, cause the processor to:
   detect a first participant of the one or more participants as an active speaker, and a second alternative framing of the one or more alternative framings is based at least in part upon the first participant.

19. The non-transitory processor readable medium of claim 17, wherein the video stream is sent to the one or more remote devices by way of a server, and the data descriptive of the one or more alternative framings is sent to the one or more remote devices by way of the server.

20. The non-transitory processor readable medium of claim 17, wherein a second alternative framing of the one or more alternative framings comprises two or more portions of the video stream, and each portion of the two or more portions comprises at least a portion of one unique participant of the detected one or more participants.

21. The method of claim 1, wherein a second alternative framing of the one or more alternative framings frames two or more detected participants in a single alternative framing, a third alternative framing of the one or more alternative framings frames the two or more detected participants in a set of separate framings, each separate framing including a unique participant of the two or more detected participants, and data descriptive of the first second alternative framing and the third alternative framing is sent to the one or more remote devices.

22. The apparatus of claim 13, wherein a second alternative framing of the one or more alternative framings frames two or more detected participants in a single framing, a third alternative framing of the one or more alternative framings frames the two or more detected participants in a set of separate framings, each separate framing including a unique participant of the two or more detected participants, and data descriptive of the first second alternative framing and the third alternative framing is sent to the one or more remote devices.

23. The non-transitory processor readable medium of claim 17, wherein a second alternative framing of the one or more alternative framings frames two or more detected participants in a single alternative framing, a third alternative framing of the one or more alternative framings frames the two or more detected participants in a set of separate framings, each separate framing including a unique participant of the two or more detected participants, and data descriptive of the first second alternative framing and the third alternative framing is sent to the one or more remote devices.

24. The method of claim 1, wherein at least one of the one or more remote devices is operable to generate the first alternative framing from the transmitted video stream and provide the generated first alternative framing for display.

25. The method of claim 24, wherein the at least one of the one or more remote devices is operable to generate the transmitted video stream and provide the generated video stream for display.

26. The method of claim 1, wherein the first alternative framing corresponds to a rectangular portion of the video stream.

27. The method of claim 1, wherein one of the one or more remote devices comprises a video conference endpoint.

28. The method of claim 1, wherein one of the one or more remote devices comprises a server.

29. The apparatus of claim 13, wherein at least one of the one or more remote devices is operable to generate the first alternative framing from the transmitted video stream and provide the generated first alternative framing for display.

30. The apparatus of claim 29, wherein the at least one of the one or more remote devices is operable to generate the transmitted video stream and provide the generated video stream for display.

31. The non-transitory processor readable medium of claim 17, wherein at least one of the one or more remote devices is operable to generate the first alternative framing from the transmitted video stream and provide the generated first alternative framing for display.

32. The non-transitory processor readable medium of claim 31, wherein the at least one of the one or more remote devices is operable to generate the transmitted video stream and provide the generated video stream for display.

\* \* \* \* \*